J. S. COPELAND.
Screw Gage.

No. 61,926.

Patented Feb. 12, 1867.

Witnesses:
John H. Shumway
Altee Jr. Tibbits

Inventor
J. S. Copeland
By his atty
John E. Earle

United States Patent Office.

J. S. COPELAND, OF BRIDGEPORT, CONNECTICUT.

Letters Patent No. 61,926, dated February 12, 1867.

IMPROVED SCREW GAUGE.

*The Schedule referred to in these Letters Patent and making part of the same.*

TO ALL WHOM IT MAY CONCERN:

Be it known that I, J. S. COPELAND, of Bridgeport, in the county of Fairfield, and State of Connecticut, have invented a new Improved Screw Gauge; and I do hereby declare the following, when taken in connection with the accompanying drawings, and the letters of reference marked thereon, to be a full, clear, and exact description of the same, and which said drawings constitute part of this specification, and represent, in—

Figure 1:
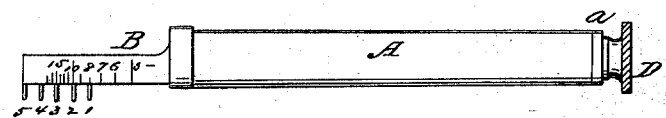
Figure 2:
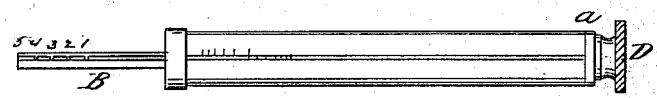
Figure 3:
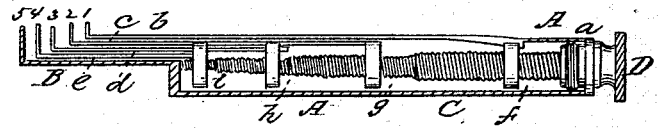

Figure 1, a side view.
Figure 2, an edge view; and in
Figure 3, a longitudinal section.

The object of this invention is to produce a gauge by which the threads of screws may be measured. It is well known that very few shops use the same thread in cutting screws, and a great inconvenience is often experienced from the difficulty of ascertaining exactly what the thread is. By my improvement this difficulty is entirely overcome, and the thread of the screw may be readily told, whatever it may be, and consists in forming a gauge of several points, which are graduated in their movement, so that, moving from a fixed point, the several points maintain an equal distance between each other, and these several points, when set to correspond with the thread to be measured, a scale on the instrument indicates the exact number of the threads; and that others may be enabled to construct and use my gauge, I will proceed to describe the same as illustrated in the accompanying drawings.

A is a cylindrical case, in one end of which is fixed a bearing, $a$, which holds and permits the turning of a screw, C, within the case. Upon the opposite end of the said case projects an arm, B. Through the said case and arm is formed a narrow slot, in which are placed four bars, $b\ c\ d$ and $e$, (more or less,) each provided with points, 1 2 3 4, respectively projecting through the slot in the arm B, as seen in fig. 1. A point, 5, is fixed to the outer end of the arm B. Each of the bars, $b\ c\ d$ and $e$, are respectively attached to nuts, $f\ g\ h$ and $i$, on the screw C, and a thread on the said screw C is cut so that while it draws the point 4 from the point 5, the point 3 is drawn twice as far, the point 2 three times as far, and the point 1 four times as far, and so on, according to the number of points. This is accomplished by a difference in the thread on that part of the screw which operates upon the respective nuts. The said screw is turned to thus operate the points by means of a head, D, or otherwise; therefore, to whatever position the said points are moved, they will always be equidistant. On the arm B I graduate a scale, (see fig. 1,) to which the first point 1 is adjusted, which scale indicates the number of threads, or a scale may be graduated on the cylinder, as seen in fig. 2.

To ascertain the exact number of a threaded screw, adjust the points until they correspond exactly to the points or roots of the thread on the screw, then by an examination of the scale the exact number may be ascertained. I believe the manner which I have described for adjusting the points to be the best, yet other means may be devised for such adjustment, and although I have described my invention for a screw gauge, yet it is equally applicable to other purposes.

Having thus fully described my invention, what I claim as new and useful, and desire to secure by Letters Patent, is—

A screw gauge, constructed substantially as described.

J. S. COPELAND.

Witnesses:
JOHN E. EARLE,
ALTSIE J. TIBBITS.